Dec. 18, 1951 G. A. HINDS 2,578,974
ELECTRIC RAZOR
Filed Sept. 18, 1946
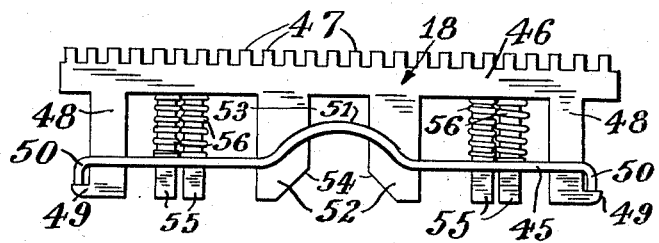
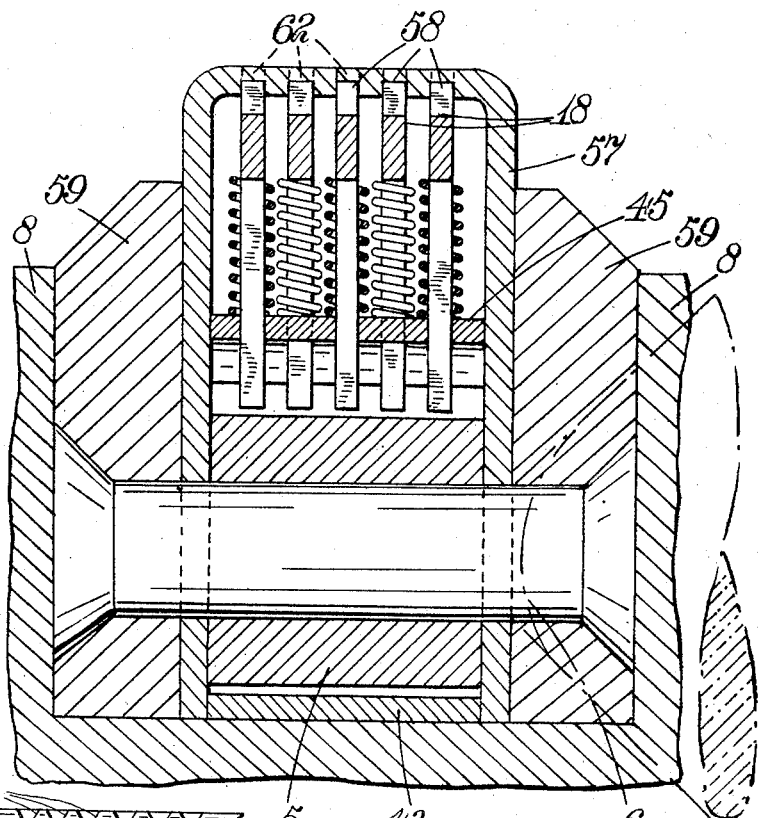
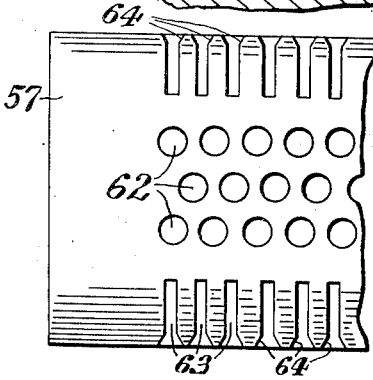
Inventor
George A. Hinds
by Wilkinson & Mawhinney
Attorneys Patented Dec. 18, 1951

2,578,974

UNITED STATES PATENT OFFICE 2,578,974

ELECTRIC RAZOR

George Arthur Hinds, Malvern, England, assignor to George Hinds Ltd., Malvern, England, a British company Application September 18, 1946, Serial No. 697,674
In Great Britain January 28, 1946

14 Claims. (Cl. 30—43)

This invention relates to a cutter unit for an electric razor. According to this invention the cutter unit comprises a number of separate cutter blades having toothed cutting edges mounted side by side in a retaining rack so as to be capable of movement in a direction transverse to their toothed cutting edges, and in the general plane of each blade.

Preferably the rack is provided with resilient means yieldingly opposing said transverse movement of the blades.

The retaining rack may be formed with a number of slots for accommodating said blades and for spacing them apart.

A part of each blade on the opposite side of the rack to the cutting edge of the blade may be arranged to overlie that side of the rack and spring means are arranged to bear on the other side of the rack and on an abutting face of the blade.

For example each cutter blade may be provided with a number of stems which are arranged to extend through the accommodating slots in said rack which stems are provided with retaining projections which extend to one side of said slot and wherein helical compression springs encircle said stems and bear on said rack.

In one construction each cutter blade is provided with a stem at either end and a fork at the centre adapted to receive an operating member and two other stems arranged respectively between said fork and the outer stems each of which other stems are encircled by a helical spring and each of which outer stems is provided with a projection overlying a flanking part of a slot in said rack.

The inner stems are preferably unsymmetrically arranged with respect to the outer stems so that the blades may be so assembled side by side with the inner stems of adjacent blades arranged in staggered relationship thereby enabling comparatively large helical springs to surround them without fouling one another. The fork at the centre of each blade may be provided with a chamfered mouth so as to assist the entry of the operating member in assemblage.

The rack may be stamped from sheet metal and has its marginal edges beyond the ends of said slots bent over so as to stiffen the rack in a direction transverse to the length of the slots.

The centre portion of the slotted sheet metal rack may be arched so as to give the rack sufficient resilience to enable its ends to be spread apart and the stems with the projections to be passed through the slots.

In any of the arrangements referred to above the cutter unit may be reciprocably mounted in a U-shaped perforated guard the inner face of the bottom of which is provided with shallow grooves for guiding the toothed edges of said cutter blades.

The guard may be formed from sheet metal the side walls of which are strengthened by side plates.

The head may be retained in a socketed mounting attached to the body of the razor which mounting is provided with end posts for closing the ends of the U-shaped guard.

The cutting head may be removably mounted in said mounting and is retained therein by a clamping screw extending through a wall of the socket and engaging said head.

The following is a description of one embodiment of the invention reference being made to the accompanying drawing in which:

Figure 1 is a side elevation of the cutter unit.

Figure 2 is a cross-section through the cutter unit assembled in the guard and socketed mounting, and Figure 3 is a face view of the guard.

The cutter unit comprises a number of separate blades 18 spaced apart in a slotted rack 45. Each cutter blade is provided, along one straight flange portion 46, with rectangular cutting teeth 47 spaced apart along the length thereof. The cutter blades are stamped from sheet metal and are provided near each end of said flange portion with stems 48 which extend through the slots in rack 45 and are provided with outturned lips 49 which are engaged by bent over portions 50 of the rack so that the cutter blades are retained therein as a unit. The rack is also stamped from sheet metal and is rendered rigid by the aforesaid bent over portions 50 while a bowed portion 51 gives it the required degree of resilience to enable the cutter blades to be sprung in during assembly. The cutter blades are each provided with forked limbs 52 at the centre to provide a slot 53 which may be engaged by the operating member. The mouth of the slot may be chamfered at 54 to facilitate the entry of the operating member during assemblage. Each cutter blade is also provided with two inner or intermediate spring locating stems 55 which are unsymmetrically arranged in relation to the outer stems 48. In other words, one of the inner stems 55 on each side of the forked limbs 52 is nearer its adjacent outer stem 48 than is the other inner stem to its adjacent outer stem. With this structure the blades may be assembled side by side with the inner stems 55 of adjacent blades arranged in staggered relationship to one another. This arrangement eliminates the necessity of making two types of blades with the inner stems 55 at different locations. The stems 55 are encircled by helical compression springs 56 the ends of which abut the flange portion 46 of the blade and the rack 45 respectively. The object of the staggering of the stems is to prevent the springs of adjacent blades fouling one another.

As will be seen from Figure 2 the cutter unit is arranged to reciprocate within a U-section guard plate 57 which is provided on the inner face of the bottom of the U with a number of shallow grooves 58 for guiding the toothed edges of the cutter blades. The width of the rack makes a good sliding fit within the guard so that the planes of the blades are normal to the bottom of the U-shaped guard. The side walls of the guard plate are reinforced on the outer sides by side plates 59 secured thereto by rivets 6 which pass through distance tubes 5 arranged within the guard. The end of the insulating operating member, not shown, engages the bowed portion 51 within the slot 53 thereby slightly compressing the springs 56 which in their turn press the cutter blades against the bottom of the grooves in the guard. The ends of the guard are closed by end posts, not shown, formed integrally with the socketed mounting.

Small holes 62 for the passage of the hairs extend through the guard plate at the bottoms of the grooves 58 so as to provide a number of rows of holes and as will be seen from Figure 3 the holes in adjacent rows are arranged in staggered relationship. The outer rows of holes are flanked by rows of slots 63 which intersect the side walls of the guard plate and the outer grooves. The thickness of the metal at the bottoms of the grooves where intersected by the holes is made smaller than the thickness of the metal at the bottom of the grooves where intersected by the slots thereby enhancing the closeness of cut obtainable.

The side slots are provided with leads 64 which facilitate the entry of the hairs.

I claim:

1. A cutter head for a motor driven razor comprising a number of separate cutter blades each having toothed cutting edges, a retaining rack adapted to locate said blades side by side in spaced relationship, a single guard enclosing said blades and having on the inner face thereof a number of grooves arranged to accommodate the toothed edges of said blades and to constrain them to reciprocate in the direction of their length, which guard is also provided with a number of apertures extending through the thickness of the guard opposite said grooves and spring means disposed between a part of said retaining rack and a part of each blade, which rack is formed with a socket, the bottom of which is adapted to be engaged by the end of a reciprocable driving element whereby the blades are pressed against the bottoms of the grooves.

2. A cutter head for a motor driven razor comprising a number of separate cutter blades each having toothed cutting edges, a retaining rack adapted to locate said blades side by side in spaced relationship, a single guard enclosing said blades and having on the inner face thereof a number of grooves arranged to accommodate the toothed edges of said blades and to constrain them to reciprocate in the direction of their length, which guide is also provided with a number of apertures extending through the thickness of the guard opposite said grooves, spring means arranged between a face on each blade and a retaining portion of said rack so as to tend to force said blade into a groove in the guard and stop means on each blade arranged to limit the extent of movement imparted by the spring means, said rack being formed with a socket the bottom of which is adapted to be engaged by the end of a reciprocable driving element whereby the blades are resiliently pressed against the bottoms of the grooves.

3. A cutter head for a motor driven razor according to claim 2, wherein said rack is provided with a socket for engagement by a reciprocating part of said motor which socket is so dimensioned that when the head is in position the said retaining portion of the rack is forced away from the faces of the blades thereby compressing the springs.

4. A cutter head for a motor driven razor comprising a number of separate cutter blades each having toothed cutting edges, a slotted plate having spaced parallel slots through which said cutter blades extend, a single guard enclosing said blades and plate and having on the inner face thereof a number of grooves arranged to accommodate the toothed edges of said blades and to constrain them to reciprocate in the direction of their length and which guard is also provided with a number of apertures extending through the thickness of the guard opposite said grooves, a number of springs each arranged between that face of the plate directed towards said grooves in the guard and an oppositely directed face on each cutter and stop means on each cutter overlying the opposite face of said plate, said slotted plate being formed with a socket the bottom of which is adapted to be engaged by the end of a reciprocable driving element whereby said blades are resiliently pressed against the bottom of the groove.

5. A cutter head for a motor driven razor comprising a number of separate cutter blades each having a toothed cutting edge and a number of stems extending away from the cutting edge, a slotted retaining rack through which said stems extend, helical springs encircle certain of said stems and abutting at one end said rack and at the other a face for said blade and certain of which stems are provided with projections which overlie the rack on the opposite side thereof to said cutting edges, a single guard enclosing said blades and having on the inner face thereof a number of grooves arranged to accommodate the toothed edges of said blades and to constrain them to reciprocate in the direction of their length, which guard is also provided with a number of apertures extending through the thickness of the guard opposite said grooves and spring means disposed between a part of said retaining rack and a part of each blade, said rack being formed with a socket the bottom of which is adapted to be engaged by the end of a reciprocable driving element whereby said blades are resiliently pressed against the bottoms of the grooves.

6. A cutter head for a motor driven razor comprising a number of separate cutter blades each having a toothed cutting edge and a stem at each end thereof and a forked portion at the center and an intermediate stem on either side of said fork all of which extend away from the cutting edge, a slotted retaining rack through which said stems and fork extend, helical springs encircling said intermediate stems and abutting at one end said rack and at the other faces on said blade and which other stems are provided with projections which overlie the rack on the opposite side thereof to said cutting edges, a single guard enclosing said blades and having on the inner face thereof a number of grooves arranged to accommodate the toothed edges of said blades and to constrain them to reciprocate in the direction of their length, which guard is also provided with a number of apertures extending through the thickness of the guard opposite said grooves, said retaining rack being formed with a socket the bottom of which is adapted to be engaged by the end of a reciprocable driving member whereby said blades are resiliently pressed against the bottoms of the grooves.

7. A cutter head for a motor driven razor according to claim 6, wherein one of said intermediate stems is nearer its adjacent outer stem than is the other intermediate stem to its adjacent outer stem.

8. A cutter head for a motor driven razor according to claim 6, wherein the forked portion is so shaped as to provide a flared mouth.

9. A cutter head for a motor driven razor according to claim 4, wherein said slotted plate is of sheet metal having its marginal edges beyond the ends of the slots bent over.

10. A cutter head for a motor driven razor according to claim 9, wherein the center portion of the slotted sheet metal plate is arched to impart resiliency to said plate to facilitate entry of the blades into said plate.

11. A reciprocable cutter head according to claim 1, wherein said guard is of U-shaped sheet metal and wherein strengthening plates are secured to its side walls.

12. A reciprocable cutter head according to claim 11, wherein closure members are associated with the ends of the U-shaped guards said closure members being arranged for attachment to the main body of the razor.

13. A cutter head for a motor driven razor having a reciprocable driving element comprising a plurality of separate cutter blades each consisting of a flange member along one edge of which are provided cutting teeth and along the other edge of which depends stem and forked members, a retaining rack having openings therethrough adapted to receive the stem and forked members of said cutting blades to locate said blades side by side in spaced relation, a single guard of U-shaped construction enclosing said blades and having on the inner face thereof a plurality of grooves arranged to accommodate the teeth of said blades and to constrain them to reciprocate in the direction of their length, said guard being also provided with a number of apertures extending through the thickness thereof opposite said grooves, spring means arranged between the edge of said cutter blades having the stems and forked members and said retaining rack for forcing said blades into a groove in said guard, and stop means carried by each blade arranged to limit the extent of movement imparted by said spring means.

14. A cutter as claimed in claim 13 characterized by the fact that said spring means are a plurality of helical springs carried about said stem members depending from the flange of the cutter blades.

GEORGE ARTHUR HINDS.

REFERENCES CITED

The following references are of record in the file of this patent:

UNITED STATES PATENTS

| Number | Name | Date |
| --- | --- | --- |
| 2,253,156 | Weidenman | Aug. 19, 1941 |
| 2,284,038 | Bruecker | May 26, 1942 |
| 2,296,134 | Wright | Sept. 15, 1942 |
| 2,314,068 | Benner | Mar. 16, 1943 |
| 2,337,623 | Romao | Dec. 28, 1943 |
| 2,360,679 | Holsclaw | Oct. 17, 1944 |